United States Patent
Okumura et al.

(10) Patent No.: US 6,553,493 B1
(45) Date of Patent: Apr. 22, 2003

(54) SECURE MAPPING AND ALIASING OF PRIVATE KEYS USED IN PUBLIC KEY CRYPTOGRAPHY

(75) Inventors: Kenneth K. Okumura, Sunnyvale, CA (US); Garret L. Simpson, San Jose, CA (US); Jason N. Paul, San Jose, CA (US); Binh P. Le, San Jose, CA (US)

(73) Assignee: VeriSign, Inc., Mountain View, CA (US)

( * ) Notice: Subject to any disclaimer, the term of this patent is extended or adjusted under 35 U.S.C. 154(b) by 0 days.

(21) Appl. No.: 09/298,688

(22) Filed: Apr. 23, 1999

Related U.S. Application Data (60) Provisional application No. 60/083,323, filed on Apr. 28, 1998.

(51) Int. Cl.[7] .............................................. G06F 11/30
(52) U.S. Cl. ........................ 713/170; 713/168; 713/171; 713/176; 713/180
(58) Field of Search ................................ 713/168, 171, 713/176, 177, 180, 182, 170

(56) References Cited

U.S. PATENT DOCUMENTS 5,825,880 A * 10/1998 Sudia et al. ................ 380/286

OTHER PUBLICATIONS

Menezes, Handbood of Applied Cryptography, 1996, sec. 13.4–13.7, sec. 1.7.1, p. 536 para. 12.5.*

* cited by examiner

Primary Examiner—Thomas R. Peeso
(74) Attorney, Agent, or Firm—Kenyon & Kenyon (57) ABSTRACT

A method (200) for assigning a key pair to an entity, such as a certification authority (CA 102), includes the following steps. A key pair is generated (210). It includes a private key and a public key which form a key pair for use in public-key cryptography. The key pair is stored (220) in a cryptographic signing unit (CSU 140). The CSU (140) is then activated (230). A request for a key pair is received (240) from the entity (102). Responsive to the request, the key pair is assigned (250) to the entity (102). In a preferred embodiment, an identifier (312) is assigned to the key pair and preferably is different from identifiers assigned to other key pairs stored in the CSU (140). The identifier (312) is then included in a digital certificate (300) issued to the entity (102).

22 Claims, 4 Drawing Sheets

| | |
|---|---|
| 302 | SERIAL NUMBER |
| 304 | ISSUER DISTINGUISHED NAME |
| 306 | SUBSCRIBER DISTINGUISHED NAME |
| 308 | VALIDITY PERIOD |
| 310 | SUBSCRIBER PUBLIC KEY |
| 312 | EXTENSIONS: PRIVATE KEY IDENTIFIER |
| 314 | SIGNATURE |

SECURE MAPPING AND ALIASING OF PRIVATE KEYS USED IN PUBLIC KEY CRYPTOGRAPHY

RELATED APPLICATION

This application claims the priority benefit of U.S. Provisional Patent Application Ser. No. 60/083,323, "Key Mapping and Aliasing", by Kenneth K. Okumura, Garret L. Simpson, Jason N. Paul, and Binh P. Le, filed Apr. 28, 1998, which subject matter is incorporated herein by reference.

BACKGROUND OF THE INVENTION

1. Technical Field

This invention relates generally to public key cryptography, public key management infrastructure, and digital certificates issued by a certification authority (CA) to a subscriber, which together form part of a public key infrastructure (PKI). More specifically, the invention relates to computer-implemented techniques for permitting a certificate services provider (CSP) to generate a digital signature using a private key of a CA while simultaneously protecting the integrity of the private key.

2. Background Art

Public key cryptography is an approach to enabling secure communications using key pairs. Each key pair includes a public key and a private key. The public key and private key are related so that a message encrypted by one key may be decrypted only by the other, but it is computationally infeasible to deduce the private key given the public key. The private key is typically created and securely held by an entity; while the corresponding public key is typically made widely available. Secure communications between parties may then be enabled by using the parties' public and private keys.

The use of public key cryptography addresses many of the inherent security problems in an open network such as the Internet. However, two significant problems remain. First, parties must be able to access the public keys of other entities in an efficient manner. Second, since in many protocols entities are associated with and in some sense identified by their public keys, there must be a trustworthy method for parties to verify that a certain public key is bound to a certain entity.

A public key management infrastructure addresses both of these problems. In one common approach, the public key management infrastructure is based on digital certificates, which are used to associate a certain public key to a certain entity with some degree of integrity. A third party, commonly known as a certification authority (CA), issues digital certificates to subscribers. Each digital certificate typically includes the subscriber's public key along with other information about the subscriber, including information identifying the subscriber. One purpose of the digital certificate is to document with some integrity that the public key is associated with the subscriber. In other words, the digital certificate is a representation by the CA that the subscriber identified in the digital certificate holds the private key corresponding to the public key contained in the digital certificate. The integrity of the digital certificate is ensured because the CA digitally signs the digital certificate with his private key. Third parties who wish to verify that a certain public key corresponds to a certain subscriber may do so by examining the corresponding digital certificate, evaluating the CA's digital signature on the digital certificate, and assessing the trustworthiness of the CA issuing the digital certificate.

In certain situations, however, the CA issuing digital certificates may not want to actually generate the digital signatures for these digital certificates. Rather, the CA may have a certificate services provider (CSP) generate the digital signatures. In order to do this, the CSP must have access to the CA's private key but, for security purposes, the CA typically would prefer not to reveal its private key to the CSP.

Cryptographic signing units (CSUs) are often used to meet these two apparently conflicting requirements. A CSU is a container for securely storing keys and/or key pairs and typically also includes certain functionalities required to use the key pairs, for example the ability to generate digital signatures and/or decrypt messages using the private and public keys stored within the CSU. Hence, by using a CSU which contains the CA's private key, a CSP can generate the digital signatures required on digital certificates issued by the CA but without requiring the CA to reveal the private key.

The CSP typically operates a computer system for providing certificate services and would install a CSU with the CA's key pair on the system in order to provide the digital signing service described above. The CSP often must manage a large quantity of key pairs and the corresponding CSUs for its customers and also must be able to provide continuous uninterrupted service. On the other hand, the CSP must also be able to make changes to the key pairs which are currently activated on its system. For example, an activated key pair may be deactivated if compromised, a new key pair and new CSU may be installed and activated for a new customer, or a new key pair may be added to an existing CSU for an existing customer.

However, new key pairs are typically generated and stored in CSUs in a highly secure key generation procedure at a location separate from the CSP's system. The CSU is then physically transported to the CSP's system and installed. This is operationally disruptive because a new CSU must be individually installed for each new CA. Furthermore, for a CSU to which a new key pair is to be added, the CSU must first be de-installed from the system, the new key pair generated and stored to the CSU, and then the CSU is re-installed. For the duration of the key generation procedure, the CSU and all of the key pairs previously stored within it will not be available to the CSP's system. In addition, since a CSP may make a fair number of changes to the key pairs on its system, the amount of physical activity required to execute the key generation procedure and install the resulting CSU for each individual key pair is significant.

As an additional drawback, key pairs stored in a CSU are typically identified by the distinguished name of the CA to which the key pairs are assigned. However, a single CA may use multiple key pairs, for example for different digital certificates or for different purposes. These key pairs will all be identified by the same name (i.e., the CA's distinguished name) and, therefore, must be stored in different CSUs since most CSUs do not allow the storage of key pairs with the same name. This leads to the proliferation of CSUs and more physical activity to maintain the increased number of CSUs.

Thus, there is a need for approaches which allow a CSP to use CSUs but which reduces the operational disruption of continuously de-installing and installing CSUs and which also reduces the physical activity required to generate key pairs and install the corresponding CSUs. There is further a need for approaches which allow multiple key pairs for a single CA to be stored in a single CSU.

DISCLOSURE OF INVENTION

In accordance with the present invention, a method (200) for assigning a first key pair to an entity, such as a CA (102), includes the following steps. A first key pair is generated (210). It includes a first private key and a first public key which form a key pair for use in public-key cryptography. The first key pair is stored (220) in a CSU (140). The CSU (140) is then activated (230). A first request for a key pair is received (240) from the entity (102). Responsive to the first request, the first key pair is assigned (250) to the entity (102). In a preferred embodiment, an identifier (312) is assigned to the first key pair and preferably is different from the identifiers assigned to other key pairs stored in the CSU (140). The identifier (312) is also included in a digital certificate (300) issued to the entity (102). In another aspect of the invention, a computer readable medium stores the digital certificate (300).

In another aspect of the invention, a private key of an entity (102) and a corresponding public key form a key pair for use in public-key cryptography. The key pair is stored in a CSU (140) and is assigned an identifier (312). A method (400) for digitally signing a message with the private key includes the following steps. A request to digitally sign a message with a private key of an entity (102) is received (410). The identifier (312) for the private key is also received (410). A digital signature of the message is generated (430) using the private key identified by the identifier (312). In another aspect of the invention, a system for providing digital certificate services includes a certificate services engine (120) for executing the above steps and a CSU interface for coupling the CSU (140) with the certificate services engine (120).

The present invention has numerous advantages. For example, since key pairs are generated (210) and stored (220) on the CSU (140) independent of the CA's (102) actual requests for key pairs, a large quantity of key pairs may be generated (210) and stored (220) on a large number of CSUs (140) at the same time. The resulting CSUs (140) may then be activated (230) on the CSP's (104) system at the same time. In other words, the key pairs may be generated (210), stored (220), and activated (230) in batch mode rather than one at a time as CAs (102) request them. This process may be automated, reducing the amount of physical activity required. In addition, since CSUs (140) with pre-stored key pairs are already installed when a new CA (102) requests a key pair or an existing CA (102) requests an additional key pair, the CSU (140) need not be de-installed and re-installed, thus significantly reducing any operational disruption. As a final example, since different key pairs within a CSU (140) are assigned different identifiers (312), a single CSU (140) may be used to store multiple key pairs used by a CA (102), thus reducing the number of CSUs (140) required.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

This invention relates generally to public key cryptography, digital signatures, and digital certificates issued by a certification authority (CA), which together form part of a public key infrastructure (PKI). Before turning to the Figures, it is useful to first describe these underlying concepts.

Public key cryptography is an approach to secure communications using key pairs. Each key pair includes a public key and a private key, each of which is typically a large number. Typically, the private key is securely created and held by an entity; while the public key is made widely available. The public key and private key are mathematically related so that a message encrypted by one key may be decrypted only by the other, but the relationship is such that it is computationally infeasible to calculate the private key given the public key. In other words, if a third party knows an entity's public key, which is typically the case, it is computationally infeasible to deduce the corresponding private key, which is typically held securely by the entity. Preferred public key algorithms include the RSA algorithm.

A private key may be used to "digitally sign" digital messages. An entity "digitally signs" a message by encrypting either the message or a processed version of the message using the entity's private key. This allows a third party to authenticate the message by verifying that (i) it is that entity's private key (rather than some other key) which has been used to digitally sign the message; (ii) the contents of the message have not changed since the message has been digitally signed; and (iii) if the corresponding public key is held to be bound to the entity, then the entity cannot later deny that he digitally signed the message. The first characteristic is often referred to as "proof of origin" or "paternity," the second as "integrity," and the third as "non-repudiation of origin."

Preferably, a message is digitally signed by first producing a one-way hash (see below) of the message, creating what is commonly referred to as a message digest. The message digest is then encrypted using the entity's private key to produce the digital signature for the message. A third party typically receives both the message and corresponding digital signature and then authenticates the message as follows. The third party decrypts the received digital signature using the entity's public key to yield a decrypted message digest, which ideally should be identical to the original message digest. The third party also generates a one-way hash of the received message, using the same hash function as was used by the entity, to yield a newly generated message digest. The third party then compares the decrypted message digest and the newly generated message digest. If the third party determines that the two message digests are identical, the third party has verified the digital signature and authenticated the message.

A hash function is a transformation which transforms a variable-size input into a fixed-size output. The output typically is smaller than the input and is referred to as the hash of the input. A one-way function is a transformation that is significantly easier to perform in one direction than in the opposite direction. A one-way hash function is a transformation with both of these characteristics. One-way hash functions used to produce digital signatures preferably also produce outputs which are generally smaller in size than the input, are able to handle inputs of any size, are computationally infeasible to reverse, and are collision-free to some degree. Hash functions, by their general nature, are many-to-one functions, meaning that many inputs may map to the same output. However, if the chosen hash function is collision free, this potential problem is obviated for all practical purposes. A hash function is weakly collision free if, given an input, it is computationally infeasible to find another input which maps to the same output. A hash function is strongly collision free if it is computationally infeasible to find any two inputs which map to the same output. Preferred one-way hash functions for creating digital signatures include MD5 and SHA-1.

The use of public key cryptography addresses many of the inherent security problems in an open network such as the Internet. However, two significant problems remain. First, parties must be able to access the public keys of many entities in an efficient manner. Second, since communications and transactions are secured by relying upon the key pairs, and entities are associated with and in some sense identified by their public keys, there must be a secure method for third parties to establish that a certain public key is bound to a certain entity.

A public key management infrastructure addresses these two problems. In a common approach, the public key management infrastructure is based on digital certificates. A "digital certificate" is a digital message which asserts that a certain public key is bound to a certain entity. The entity may be an individual, a legal entity, a web server, or any other type of user. More specifically, a digital certificate preferably is issued by a third party known as a certification authority (CA) and asserts, based on the CA's reputation and its practices, that the certain public key is bound to the certain entity. The digital certificate contains information pertaining to the identity of the entity (a.k.a., the subscriber of the CA service or the subject of the digital certificate) and the entity's public key, and the digital certificate is digitally signed by the CA to secure this information.

The digital certificate asserts that the public key in the digital certificate is bound to the certificate's subject. Parties who wish to validate this assertion may verify the CA's digital signature and the integrity of the contents of the digital certificate in the manner described above. If the validating party additionally trusts the CA's practices or otherwise recognizes a digital certificate as being trustworthy (e.g., based on past experience), then for the validating party's purposes, the digital certificate is valid and the validating party has accepted that the public key in the digital certificate is bound to the certificate's subject. Hence, if an unknown party communicates with the validating party using the private key corresponding to the public key in the digital certificate, the validating party can further establish that the unknown party is the subject named in the digital certificate. That is, he can authenticate the unknown party. If the validating party does not have a basis for trusting the CA issuing the certificate, the validating party will begin to establish such a basis by validating the CA's own digital certificate. The validating party will continue to validate digital certificates, traversing up a chain of digital certificates issued to CAs, until it reaches a point which it trusts. At this point, the validating party can establish that the public key in the digital certificate is bound to the certificate's subject.

Digital certificates preferably comply with the ITU-T Recommendation X.509 (1997 E), as developed by the ISO/IEC/ITU groups (hereafter, "X.509"). The digital certificate may be stored on or in any type of computer readable media, including but not limited to hard drives, smart cards, flash memory, floppy drives, magnetic stripes such as on the back of credit cards, or as printed bar codes. They are commonly transferred over network protocols.

For security and other reasons, digital certificates typically expire after a certain period of time. For example, when digital certificates are issued, they may have an effective date and an expiration date, with the digital certificate being potentially valid only between these dates. Furthermore, if a digital certificate is revoked prior to its expiration date, notice of that status may be issued by placing it onto a certificate revocation list (CRL) or by other means.

A public key infrastructure (PKI) is a system of digital certificates, CAs, and other infrastructure for the purpose of authenticating parties. A number of digital certificate services are typically provided in order to establish, disseminate, maintain, and service the public keys and associated digital certificates used in a PKI. These services are typically provided by either CAs or third parties, which shall be referred to as certificate service providers (CSPs).

Figure 1:
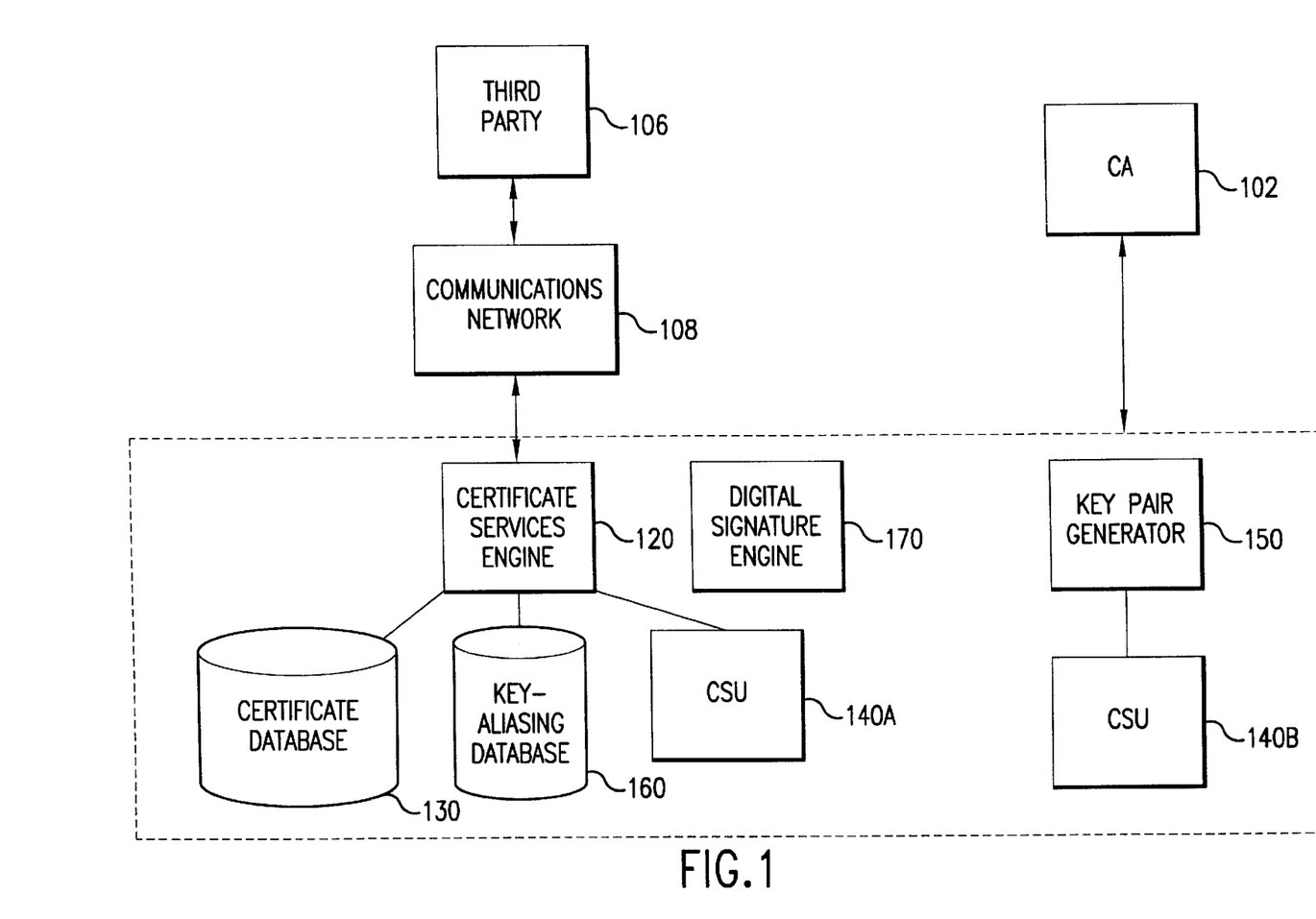
FIG. 1 is a block diagram of a system in accordance with the present invention.

Turning now to the Figures, FIG. 1 is a block diagram of a system in accordance with the present invention. The system includes three entities: CA 102, CSP 104 and a third party 106. Each of these entities may be individuals, groups of individuals, legal entities such as corporations, computers, and the like. The parties may communicate with each other via any means, including by telephone, mail, in person, over computer networks, or by physically transporting digital data to each other such as on tapes or disk drives. In the example of FIG. 1, CSP 104 and third party 106 are both coupled to communications network 108, preferably the Internet, and communicate with each other over network 108.

CA 102 issues digital certificates to subscribers. CA 102, however, does not want to actually generate the digital signatures for these digital certificates because, for example, CA 102 might not want to build or maintain all of the infrastructure necessary to securely and reliably generate the required digital signatures. Instead, CA 102 has CSP 104 generate the digital signatures for digital certificates issued by CA 102. CSP 104 also manages the required infrastructure; provides adequate security, reliability, dependability, and redundancy for the infrastructure; and possibly also provides sufficient tools to allow third parties 106 and/or CA 102 to easily access the infrastructure.

As an example, CA 102 may be a company which wishes to issue digital certificates to its employees. Alternately, CA 102 may be a bank which wishes to issue digital certificates to its depositors. As another example, a single CA 102 might use multiple key pairs to issue digital certificates to different constituencies for different purposes. Thus, the bank may use one key pair (or set of key pairs) to issue digital certificates to bank tellers for use in overseeing their actions; another set of key pairs to issue digital certificates to bank branch office mangers to authorize overtime for the tellers; and yet another set of key pairs to issue digital certificates to the bank's internal auditors for purposes of verifying the bank's records. Alternately, an organization, such as a company, may have many different CA 102s which issue digital certificates to different constituencies for different purposes. For example, each department within a company may be represented by a different CA 102 and within each department, there may be further subdivisions.

Continuing the bank example from above, the bank may not want to invest in the infrastructure required to support the various key pairs and therefore delegates some or all of these functions to CSP 104s such as VeriSign. As an example, the CSP 104 may be responsible for generating the key pairs. The CSP 104 may also be responsible for generating the digital signature for each digital certificate issued by CA 102. Note that in this case, the private key of each key pair should be securely held by the CA 102, possibly to the exclusion even of the CSP 104. However, the CSP 104 must have access to the private key in order to generate the digital signature for digital certificates issued by CA 102 since each such digital certificate is digitally signed using CA 102's private key. In other words, the digital signature for a digital certificate issued by CA 102 is generated by CSP 104 using CA 102's private key.

The remainder of FIG. 1 illustrates a preferred embodiment in accordance with the invention which permits CSP 104 to generate the required digital signatures without compromising CA 102's private key. The system includes a certificate services engine 120, a certificate database 130, a cryptographic signing unit (CSU) 140 which may be located in either position 140A or 140B, a key pair generator 150, and preferably also a key-aliasing database 160 and digital signature engine 170. The certificate services engine 120 is coupled to communications network 108; and certificate database 130 and key-aliasing database 160 are accessible by certificate services engine 120. Key pair generator 150 is isolated from the certificate services engine 120. In position 140A, CSU 140 is accessible by certificate services engine 120; while in position 140B, CSU 140 is coupled to the key pair generator 150.

Certificate services engine 120 is the interface between CSP 104 and third party 106 who may be using CSP 104's services, and may additionally implement some or all of the functions required by CSP 104 in the provision of its services. Certificate services engine 120 is preferably implemented as software running on a computer. Certificate database 150 and key-aliasing database 160 are preferably stored on mass storage systems with which the certificate services engine 120 interfaces. CSU 140, when in position 140A, interfaces with certificate services engine 120 via a dedicated CSU interface (not shown). Key pair generator 150 is preferably implemented as software running on a computer isolated from communications network 108 and also interfaces to CSU 140, when in position 140B, via a dedicated interface.

CSU 140 is a container for securely storing keys and/or key pairs and generally can store a number of key pairs. It typically also includes certain functionalities required to use the key pairs. For example, CSU 140 typically can digitally sign and/or decrypt messages using the private keys stored within it. Hence, by using a CSU 140 which contains CA 102's private key, CSP 104 can generate the digital signatures required on digital certificates issued by CA 102, but without actually having CA 102 reveal its private key to CSP 104 since the private key is securely stored within CSU 140 and is not revealed when the digital signature is generated. This reduces the potential for compromise of CA 102's private key. Preferred CSUs 140 include the LunaCA from Chrysalis-ITS. However, in order to implement this approach, CSP 104 must know which private key within which CSU 140 is assigned to CA 102.

Figure 2:
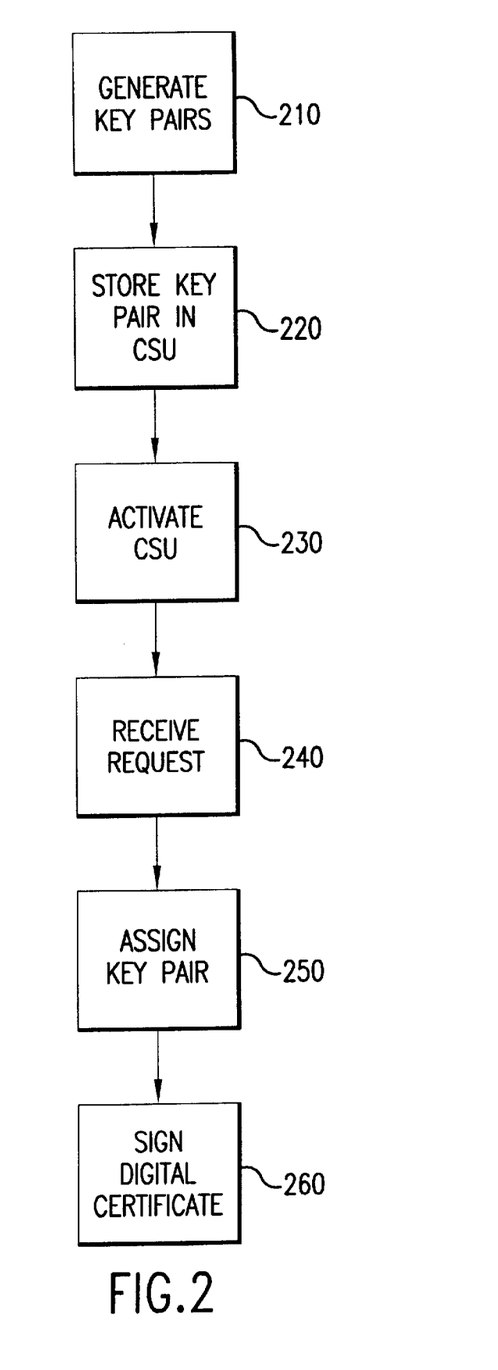
FIG. 2 is flow chart illustrating a method 200 for securely assigning a private key to a CA 102.

FIG. 2 is a flow chart illustrating a method 200 for securely assigning, or mapping, a private key to CA 102. Key pair generator 150 generates 210 a key pair, which includes a private key and a corresponding public key, and stores 220 the key pair in a CSU 140 coupled to it (i.e., in position 140B). This key pair eventually will be assigned to CA 102. However, this may not be known when the key pair is generated 210 and stored 220. In fact, since it may not be known how many key pairs CA 102 may require, key pair generator 150 preferably generates a large quantity of key pairs at the same time, for example completely filling the CSU 140 with key pairs in an automated process. Furthermore, a different identifier is assigned to each key pair when it is generated. For example, if CSU 140 holds 400 key pairs, they may be sequentially assigned the identifiers key1, key2, to key400. These identifiers act as aliases for the key pairs and may be selected to contain additional information, for example reflecting various products or services offered by CSP 104.

For security and other reasons, key pairs are generated 210 and stored 220 using a highly secure procedure. For example, key pair generator 150 typically is isolated from communications network 108 in order to reduce the possibility of a security breach. It typically is also physically isolated and secured. The key generation procedure may also be documented by legal documents, such as attestation letters signed by the parties in attendance. Alternately, a video or digital computer record of the entire procedure may be produced. At the conclusion of the key generation procedure, the key pairs generated 210 by key pair generator 150 are securely stored 220 within CSU 140. The batch approach to key generation significantly reduces the amount of physical activity required since, for example, all 400 key pairs are generated 210 and stored 220 in one key generation procedure rather than in 400 separate procedures.

However, a CSU 140 in position 140B is not useful because the keys in it cannot be used by certificate services engine 120 to fulfill requests by third party 106 or CA 102. So CSU 140 is activated 230 by decoupling the CSU 140 from key pair generator 150 and coupling it to certificate services engine 120. This typically is achieved by physically removing the CSU 140 from its interface with key pair generator 150, physically transporting it from position 140B to 140A, and then physically inserting the CSU 140 into the CSU interface to certificate services engine 120. At this point, however, the key pairs within CSU 140 still will not be used by certificate services engine 120 since they have not yet been assigned to any CA 102.

When CSP 104 receives 240 a request for a key pair from CA 102, CSP 104 assigns 250 one of the key pairs within CSU 140 to CA 102, thus establishing a mapping between that key pair and CA 102. CSP 104 typically does this by associating the identifier for the key pair with the CA 102, for example by creating a record in key-aliasing database 160. Continuing the previous bank example, if the bank CA 102 requests a first key pair for overseeing the bank teller's actions, CSP 104 might assign key1 for this purpose by establishing a corresponding record in database 160. When the bank CA 102 requests additional key pairs, CSP 104 might assign key2, key3, and so on to the CA 102 in a similar fashion. Since the assigned key pairs have been previously activated and there is no need to de-install or reinstall CSU 140, this approach significantly reduces the operational disruption caused by assigning new key pairs to a CA 102. Furthermore, since different key pairs within CSU 140 are named differently, the approach also reduces the number of CSUs 140 required.

Figure 3:
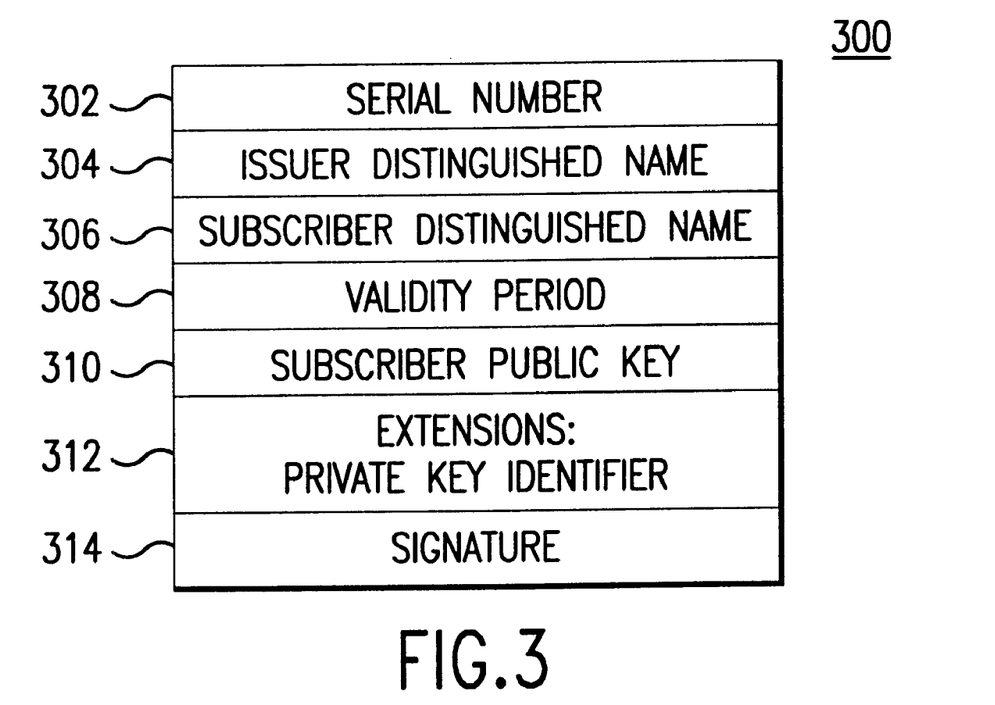
FIG. 3 is an illustration of a digital certificate 300 generated in accordance with method 200.

In a preferred embodiment, the identifier is associated with the corresponding CA 102 via a digital certificate issued to the CA 102. FIG. 3 is an illustration of a preferred embodiment of such a digital certificate 300. The digital certificate 300 complies with the ITU-T Recommendation X.509 (1997 E), as developed by the ISO/IEC/ITU groups, and preferably is stored in the digital certificate database 130 after its generation. In other embodiments, the digital certificate 300 may be stored on other types of computer readable media, such as on smart cards, in flash memory, on magnetic stripes such as on the back of credit cards, or as printed bar codes.

The digital certificate 300 includes, among other fields, a serial number 302, the issuer's distinguished name 304, the subscriber's distinguished name 306, a period of validity 308, the subscriber's public key 310, possibly digital certificate extensions 312, and the issuer's digital signature 314. In this particular example, the issuer typically will be either the CSP 104 or a CA related to CA 102. In the bank example, the issuer might be the CSP 104 or it might be another bank CA which is higher up in the certificate hierarchy for the bank. The subscriber is CA 102 since the digital certificate 300 represents that CA 102 is bound to its newly assigned public key. Hence, the subscriber's public key 310 is the public key being assigned to CA 102 (e.g., the public key-of the key pair identified by identifier "key1").

Digital certificate extensions 312 are information which may be tailored for specific purposes. In this particular embodiment, the digital certificate extensions 312 follow the X.509 format and include the identifier identifying the private key corresponding to the public key 310. For example, the digital certificate extensions 312 might include "key1" in plaintext or in some other form. The plaintext form has an additional benefit of allowing CSP 104 to visually check which key pair is assigned to which digital certificate. Alternately, it might include both "key1" and an identifier for CSU 140 since CSP 104 generally will use a large number of CSUs 140. In a preferred embodiment, the identifier identifying the key pair is contained in the SubjectAltName extension.

The issuer's digital signature 314 is a version of the information in the digital certificate 300 which has been processed using the issuer's private key (typically one-way hashed and then encrypted with the issuer's private key). The signature 314 secures the digital certificate 300. If the issuer is available to digitally sign digital certificate 300, then the digital signature 314 may be generated 260 at the same time as the assignment of key pair to CA 102, for example by digital signature engine 170. Alternately, a certificate signing request (CSR) may be generated and the issuer digitally signs 260 the digital certificate 300 upon receipt of the CSR.

The serial number 302 identifies the digital certificate 300. The issuer's and subscriber's distinguished names 304 and 306 are, respectively, the distinguished names of the issuer and subscriber. A distinguished name for an entity is information about the entity, including for example the entity's name, address, and/or email address. The period of validity 308 contains information regarding the time period during which the digital certificate 300 is valid. For example, the period of validity 308 may include an effective date and an expiration date of the digital certificate 300.

The key-aliasing database 160 preferably also contains information pertaining to digital certificate 300. For example, the relevant record may include the identifier of the assigned key pair (e.g., "key1"), the date the key pair was assigned to CA 102, information identifying CA 102, and information identifying digital certificate 300.

Figure 4:
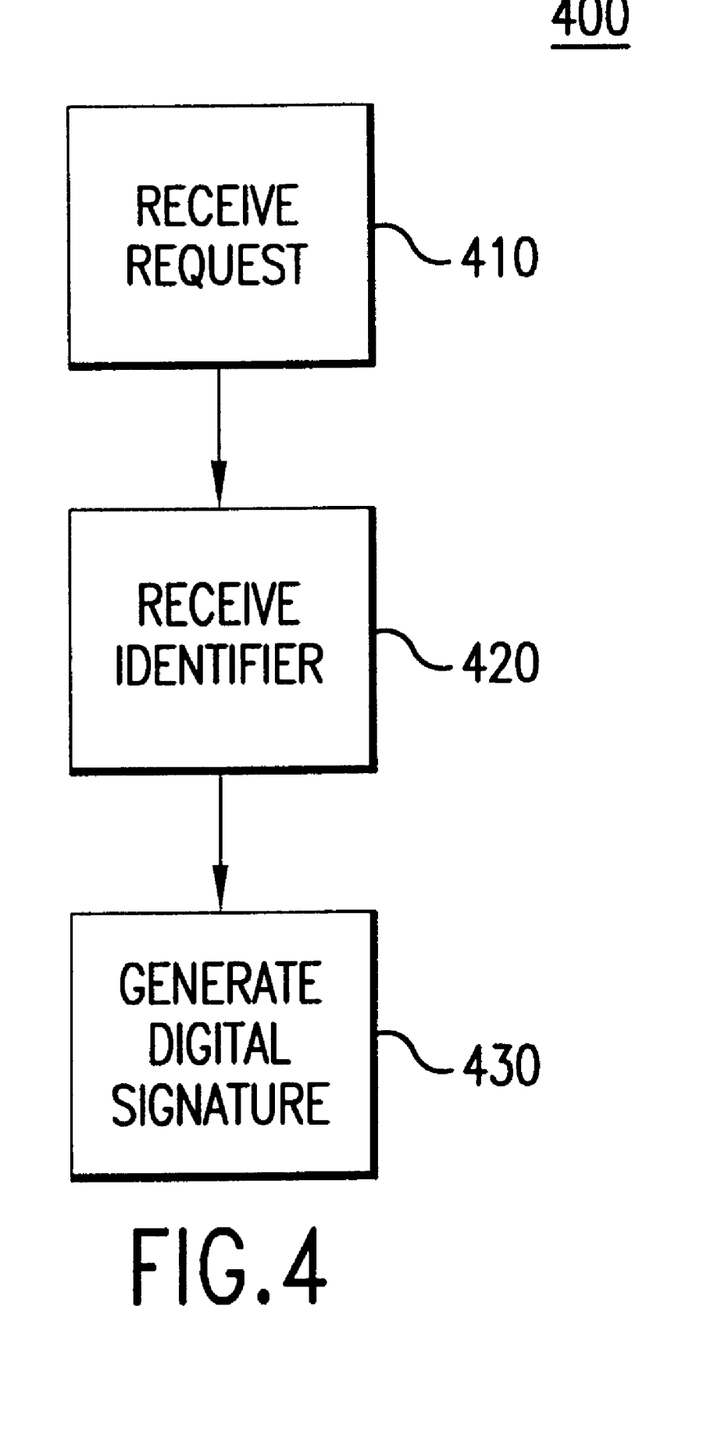
FIG. 4 is a flow chart illustrating a method 400 for digitally signing a digital certificate with a CA 102's private key.

FIG. 4 is a flow chart illustrating a method 400 for CSP 104 to digitally sign a digital certificate issued by CA 102. CSP 104 receives 410 a request from CA 102 to digitally sign an included digital certificate using CA 102's private key. CSP 104 also receives 420 the identifier for CA 102's private key. CSP 104 then generates 430 the digital signature for the digital certificate using the private key identified by the received identifier.

Continuing the above bank example, in one embodiment, the bank may request CSP 104 to generate the digital signatures required for digital certificates issued by CA 102. These requests contain the information to be included in the digital certificate. They also contain information which allows key-aliasing database 160 to be used to determine the identifier (e.g., "key1") identifying CA 102's private key.

For example, in one approach, CSP 104 may provide special software which the bank uses to make its requests. This software may embed information in the bank's request which facilitates determination of the identifier. Examples of such information include the URL from which the request is made, information identifying the bank, and/or digital signatures generated by other private keys which are associated with private key "key 1." Key-aliasing database 160 contains records which associate this information with the various identifiers. Hence, certificate services engine 120 receives 420 the identifier "key1" from key-aliasing database 160 based on the information contained in the bank's request. Certificate services engine 120 transmits the plaintext of the digital certificate to the corresponding CSU 140, which generates the digital signature using private key "key1." CSU 140 transmits the digital signature back to certificate services engine 120, fulfilling the request. As an additional check, certificate services engine 120 may verify the signature by using the public key contained in CA 102's digital certificate 300.

In an alternate embodiment, the bank may make its requests using standard CSR protocols, such as Public-Key Cryptography Standard (PKCS) #10 developed by RSA Laboratories, with each CSR digitally signed using a specific one of the bank's other private keys. Furthermore, the key-aliasing database 160 maps the corresponding public key to the identifier "key1." Hence, when the CSP 104 receives a CSR from the bank, the public key used to decrypt the digital signature of the CSR is also used to identify the relevant identifier "key1." Hence, certificate services engine 120 receives 420 the identifier "key1" from key-aliasing database 160 based on this public key.

The above description is included to illustrate the operation of the preferred embodiments and is not meant to limit the scope of the invention. The scope of the invention is to be limited only by the following claims. From the above discussion, many variations will be apparent to one skilled in the art that would be encompassed by the spirit and scope of the present invention. For example, the above embodiments concerned the situation in which CSP 104 generates the digital signature for digital certificates issued by CA 102. However, the principles illustrated above are also applicable to situations in which CSP 104 is requested to generate a digital signature of a message using another party's private key.

What is claimed is:

1. A method for assigning a first key pair to an entity, the method comprising:

generating a first key pair comprising a first private key and a first public key, wherein the first private key and the first public key form a key pair for use in public-key cryptography;

storing the first key pair in a cryptographic signing unit (CSU);

activating the CSU after the first key pair has been stored in the CSU;

receiving a first request for a key pair from the entity; and responsive to the first request, assigning the first key pair to the entity without revealing the first private key.

2. The method of claim 1 further comprising:

generating a second key pair comprising a second private key and a second public key, wherein the second private key and the second public key form a key pair for use in public-key cryptography;

s storing the second key pair in the CSU;

activating the CSU after the first and second key pairs have been stored in the CSU;

receiving a second request for a key pair from the entity; and responsive to the second request, assigning the second key pair to the entity without revealing the second private key.

3. The method of claim 2 further comprising:

assigning first and second identifiers to the first and second key pairs respectively, wherein the first and second identifiers are not identical; and the step of assigning the first and second key pairs to the entity comprises associating the first and second identifiers with the entity.

4. The method of claim 1 wherein:

the steps of generating the first key pair and of storing the first key pair occur remotely from a communications network on which the entity uses the first key pair; and the step of activating the CSU comprises coupling the CSU to the communications network.

5. The method of claim 1 further comprising:

assigning a first identifier to the first key pair; and the step of assigning the first key pair to the entity comprises associating the first identifier with the entity.

6. The method of claim 5 wherein the step of associating the first identifier with the entity comprises:

including the first identifier in a digital certificate issued by an issuer to the entity, wherein the digital certificate further includes the first public key, the digital certificate represents that the entity is bound to the first public key, and the digital certificate is digitally signed by the issuer.

7. The method of claim 6 wherein:

the digital certificate complies with the X.509 format; and the step of including the first identifier in the digital certificate comprises including the first identifier in an X.509 extension.

8. A computer readable medium for assigning a key pair to an entity, the computer readable medium storing:

a digital certificate issued by an issuer to an entity, the digital certificate representing that the entity is bound to a public key corresponding to a private key, wherein the private key has been assigned to the entity without revealing the private key, the public key and the private key form a key pair for use in public-key cryptography, the digital certificate is digitally signed by the issuer, the key pair is stored in a cryptographic signing unit (CSU), an identifier is assigned to the key pair, and the digital certificate includes subscriber information pertaining to the entity, the public key, and the identifier assigned to the key pair.

9. The computer readable medium of claim 8 wherein:

the digital certificate complies with the X.509 format; and the identifier is included in an X.509 extension.

10. The computer readable medium of claim 9 wherein:

the identifier is included in a SubjectAltName extension.

11. A method for digitally signing a message with a private key of an entity, the method comprising:

receiving a request to digitally sign a message with a private key of an entity, wherein the private key has been assigned to the entity without revealing the private key, the private key and the public key form a key pair for use in public-key cryptography, the key pair is stored in a cryptographic signing unit (CSU), and an identifier is assigned to the key pair;

receiving the identifier; and digitally signing the message with the private key identified by the identifier.

12. The method of claim 11 further comprising:

identifying the identifier responsive to information included in the request.

13. The method of claim 12 wherein:

the information included in the request includes information identifying a location from which the request was made.

14. The method of claim 11 further comprising:

identifying the identifier responsive to a second public key, wherein the request is digitally signed using a second private key, wherein the second private key and the second public key form a key pair for use in public-key cryptography.

15. The method of claim 11 wherein the step of receiving the identifier comprises:

receiving a digital certificate issued by an issuer to the entity, wherein the digital certificate represents that the entity is bound to the public key, the digital certificate is digitally signed by the issuer, and the digital certificate includes:

subscriber information pertaining to the entity, the public key, and the identifier assigned to the key pair.

16. The method of claim 15 further comprising:

verifying the digital signature with the public key included in the digital certificate.

17. The method of claim 11 wherein the step of digitally signing the message comprises:

transmitting the message to the CSU;

the CSU generating a digital signature of the message with the private key; and receiving the digital signature from the CSU.

18. The method of claim 11 wherein:

the message is a digital certificate to be issued by the entity.

19. A system for providing digital certificate services, including digitally signing a message with a private key of an entity, the system comprising:

a certificate services engine for:

receiving a request to digitally sign a message with a private key of an entity, wherein the private key has been assigned to the entity without revealing the private key, the private key and a corresponding public key form a key pair for use in public-key cryptography, the key pair is stored in a cryptographic signing unit (CSU), and an identifier is assigned to the key pair, receiving the identifier, and digitally signing the message with the private key identified by the identifier; and a CSU interface, coupled to the certificate services engine, for maintaining a message that the identifier is associated with the entity.

20. The system of claim 19 further comprising:

a key-aliasing database coupled to the certificate services engine for maintaining a message that the identifier is associated with the entity.

21. The system of claim 19 further comprising:

a key pair generator not coupled to the certificate services engine for generating the key pair and storing the key pair in the CSU.

22. The system of claim 19 further comprising:

the CSU.

* * * * *